July 26, 1932.  W. H. STEWART  1,868,508
SECTIONAL ROD AND COUPLING MEMBER THEREFOR
Filed April 12, 1929
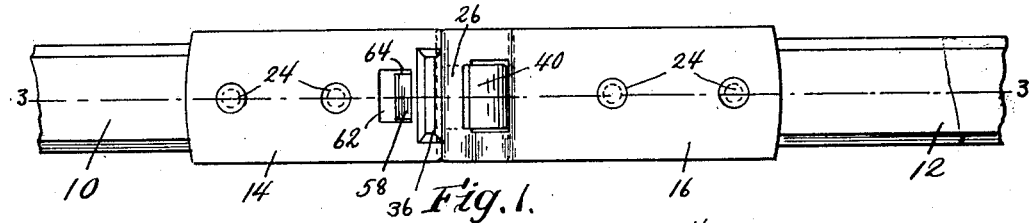
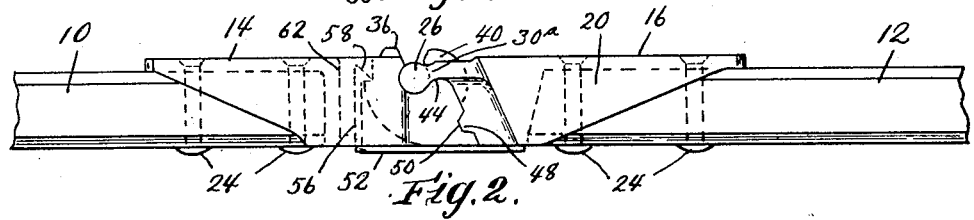
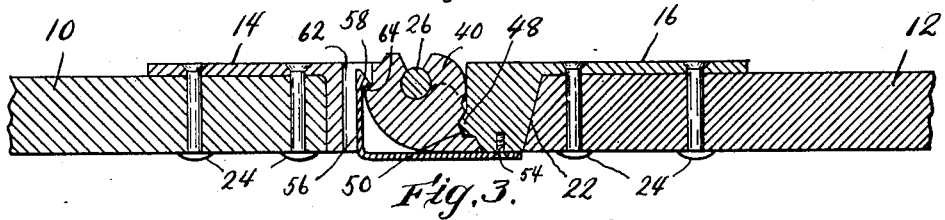
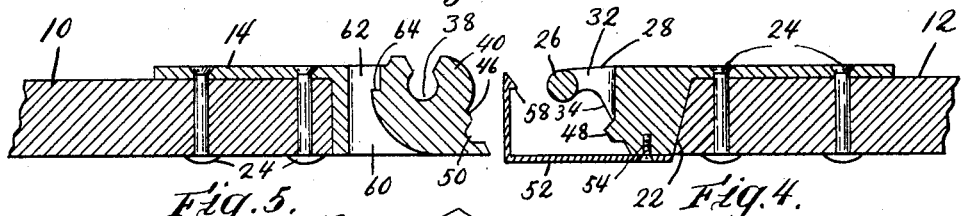
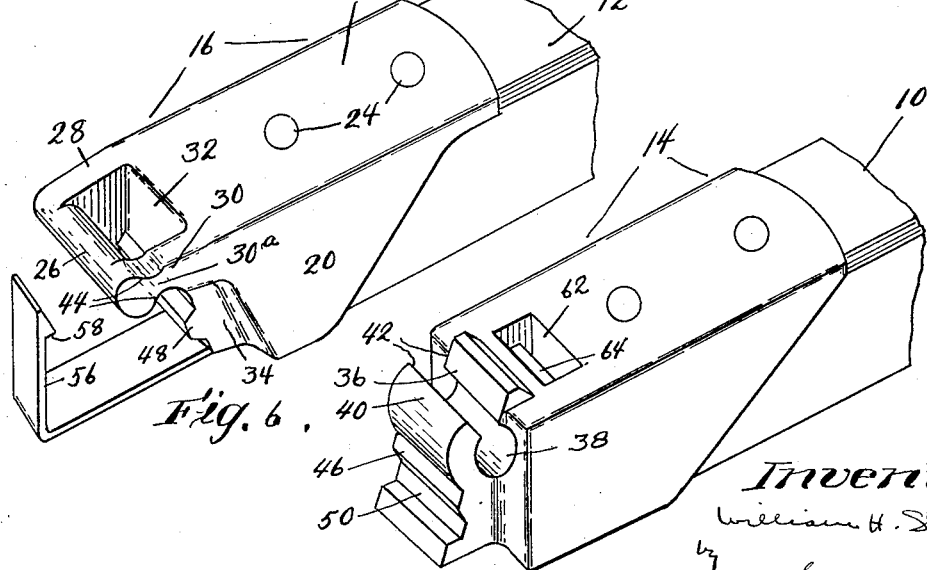
Inventor,
William H. Stewart
by
[signature]
atty Patented July 26, 1932

1,868,508

UNITED STATES PATENT OFFICE

WILLIAM H. STEWART, OF JACKSONVILLE, FLORIDA

SECTIONAL ROD AND COUPLING MEMBER THEREFOR

Application filed April 12, 1929. Serial No. 354,620.

This invention relates to sectional rods especially adapted for sewer cleaning purposes.

One of the objects of the present invention is the provision of complementary coupling members for the ends of adjacent sections of the rod that have means to couple the sections together so that they can not be uncoupled when they are in line, the coupling members having interlocking parts by which they are coupled for the transmission of torsional forces.

A further object of the invention is the provision of complementary rod coupling members which are connected together by a hook and eye construction and which also have interlocking parts that serve to transmit torsional forces between the coupling members and largely relieve the hook and eye construction from such forces.

A yet further object of the invention is the provision of complemental rod coupling members having a hook and eye connection between them so arranged that the members can not become detached when the rods are straight, and spring interlocking means for said coupling members arranged to lock the coupling members releasably together and so arranged that it is shielded against damage or accidental release when the rods are in service.

Another object of the invention is generally to improve the construction and operation of sectional rods and coupling members therefor.

Fig. 1 is a plan view of the ends of a pair of connected rod-sections and the complemental coupling members thereon.

Fig. 2 is a side elevation of the connected rods and coupling members of Fig. 1.

Fig. 3 is a sectional elevation through the coupling members of Fig. 1 taken along line 3—3 of Fig. 1.

Figs. 4 and 5 are sectional elevations of the detached male and female coupling members respectively.

Fig. 6 is a perspective view of the male coupling member.

Fig. 7 is a perspective view of the female coupling member.

As here shown, the rods 10 and 12 are provided at their adjacent ends with male and female coupling members 14 and 16 respectively. Each rod will have at one end a male coupling and at its other end a female coupling member so that a plurality of such rods can be connected together in line. The male coupling member 16 has a top wall 18 and two opposed side walls 20 which form a pocket in which the end of the rod 12 is received. The end wall 22 of said pocket is inclined and the end of the rod is similarly inclined so that the rivets 24 or other attaching means which pass through the rod and the top wall 18 to secure the rod rigidly to the coupling member draw the inclined end of the rod firmly against the inclined wall 22, thus to secure the coupling member and rod firmly and rigidly together in a manner to resist displacement upon torsionally applied forces. The female member 14 is similarly constructed to receive its rod 10. The male coupling member 16 is provided at its forward end with a hook which consists of a transversely disposed cylindrical member or bar 26 which is connected at its opposite ends by the rearwardly extended arms 28 and 30 to the body of the coupling member in such manner as to provide a passage 32 between said arms, the cylindrical member, and the body of the coupling member to receive the eye of the female coupling member. The body of the male coupling member beneath said hook is provided with a downwardly and rearwardly inclined transverse face 34 which constitutes an abutment that is adapted to engage a similar abutment of the female coupling member.

The female coupling member 14 at its forward end is provided with a projection 36 that has a transverse cylindrical eye or passage 38 in the upper end and a tongue 40 which is disposed in front of said passage and forms a part thereof. Said tongue is terminated at its upper end in spaced relation with the body of said female coupling member to provide a transverse entrance 42 into said passage; and said entrance is smaller in width than the diameter of said passage. The cylindrical member 26 of said male coupling member is adapted to be received in said passage 38 whereby to connect the two coupling members together. Since the diameter of said cylindrical member 26 is greater than the width of said entrance 42, the arm 30 of said male coupling member is provided with opposed transverse notches 44 behind said cylindrical member, thus to provide a section 30a of said arm which is sufficiently narrow to enter said entrance 42. As thus arranged, the two coupling members may be inter-connected by disposing the male coupling member at right angles with the female coupling member and with the cylindrical section 26 aligned with the cylindrical passage 38. Thus by moving the two members into engagement transversely, the arm 30 is caused to move through the entrance 42 and permit the cylindrical member 26 to be moved into the cylindrical passage 28. The recess 32 is of sufficient transverse length to receive the tongue 40 so that the coupled connecting members can be moved into line with each other as shown in Fig. 2.

The projection 36 of the female coupling member, beneath the tongue 40, is provided with a forwardly-inclined face 46 which constitutes an abutment against which the abutment 34 of the male coupling member bears, thus to hold the two coupling members in line and to transmit longitudinally applied forces between them.

In accordance with this invention, one of the coupling members, as the male coupling member 16, is provided with a transverse production or tongue 48 which extends forwardly of the abutment 34 beneath the cylindrical member 26 and, preferably, has tapered top and bottom walls. The abutment face 46 of the other coupling member is provided with a correspondingly formed transverse groove or recess 50 into which said projection 48 is adapted to be received when the members are in line. Said interfitting projection and groove constitute a key which locks the coupling members together for conjoint rotation and serves to transmit torsionally applied forces therebetween and thus relieve the hook and eye connection between said members from such forces, or cooperate with the hook and eye connection to transmit greater torsional forces. By having the projection or groove formed with tapered side walls the cylindrical member 26 can be drawn into firm engagement with the female coupling member, thus to hold the two coupling members firmly together.

Means are provided to lock the two coupling members releasably together when they are in line. Said means includes a locking member here shown as consisting of a resilient metal strip having a horizontal lower section 52 the rear end of which is secured in a suitable manner as by screws 54 to the bottom of the male coupling member 16. The strip at the forward end thereof is reflexed to provide a vertical section 56 which is disposed in front of the cylindrical member 26 and is provided with a rearwardly extended hook 58. The female coupling member is provided with a passage 60 which extends vertically therethrough and communicates with an enlarged recess 62 in the upper face thereof behind the passage 38. The recess 62 is provided with a horizontal ledge 64 at the bottom thereof which is adapted to be engaged by the hook 58 of the locking member, whereby to lock the two coupling members releasably together. The hook 58 is adapted to be entirely within said recess 62 and entirely below the level of the top of the female coupling member so that it can not become damaged or accidentally released by engagement with any foreign part that may come in contact with the coupling members when the rods are in use.

The hook may be released by the insertion of any convenient tool into the recess to spring the hook rearwardly from engagement with said ledge, thereby to permit the coupling members to be swung at right angles to each other for the purpose of disengaging them.

I claim:

1. Coupling members for the sections of a sectional rod, one of said members having a transverse cylindrical bar and arms at the sides of the bar which connect it with the body of said coupling member, the other of said coupling members having a transverse cylindrical passage and a tongue upstanding in front of said passage and forming a wall thereof, said passage having a transverse entrance at the top thereof which is of less width than the diameter of said passage, one of said arms of said first named coupling member being of such reduced thickness behind said cylindrical bar as to enter said entrance whereby to permit the entrance of said cylindrical bar into said cylindrical passage by a transverse movement of one of said coupling members with respect to the other when when the reduced section of said arm is in line with said entrance, said coupling members having cooperating flat broad transverse abutment faces which are located below said passage, one of said faces having a transverse tongue and the other of said faces having a transverse groove in which said tongue is removably received snugly, said tongue and groove being coextensive with said abutting faces and parallel with said bar constituting means which connect said coupling members together to transmit torsionally applied forces therebetween, and said tongue and groove having such configuration that they can be separated by a swinging movement of said coupling members about said cylindrical bar and means including a hook which connects said coupling members and holds said tongue releasably positioned in said groove.

2. Coupling members for the sections of a sectional rod, one of said coupling members having a transverse cylindrical member and the other of said coupling members having a transverse cylindrical passage in which said cylindrical member is removably received whereby to connect said coupling members pivotally, said members having cooperating transverse abutment faces located beneath said cylindrical member and passage which are engaged when said coupling members are in line, one of said members having a vertical passage located behind said cylindrical passage, which vertical passage is enlarged at one end to form a recess and has a ledge at the bottom of said recess, said other coupling member having a resilient locking member which extends forwardly of and below said cylindrical member and is provided with an upstanding arm that has a hooked upper end, said arm being adapted to enter said passage and its hook to engage said ledge when the two coupling members are rocked about their pivotal connection, said hooked upper end being located entirely within said recess so that it is shielded from unintentional engagement with an extraneous part.

3. Coupling members for the sections of a sectional rod, one of said coupling members having a transverse cylindrical member and the other of said coupling members having a transverse cylindrical passage in which said cylindrical member is removably received whereby to connect said coupling members pivotally, said members having cooperating transverse abutment faces located beneath said cylindrical member and passage which are engaged when said coupling members are in line, one of said members having a vertical passage located behind said cylindrical passage, which vertical passage is enlarged at one end to form a recess and has a ledge at the bottom of said recess, said other coupling member having a resilient locking member which extends forwardly of and below said cylindrical member and is provided with an upstanding arm that has a hooked upper end, said arm being adapted to enter said passage and its hook to engage said ledge when the two coupling members are rocked about their pivotal connection, said hooked upper end being located entirely within said recess so that it is shielded from unintentional engagement with an extraneous part, one of said abutment faces having a transverse tongue and the other of said abutment faces having a transverse groove in which said transverse tongue is received, whereby to interconnect said coupling members to transmit torsionally applied forces therebetween them.

In testimony whereof, I have signed my name to this specification.

WILLIAM H. STEWART.